(12) United States Patent
Liu et al.

(10) Patent No.: US 10,728,016 B2
(45) Date of Patent: Jul. 28, 2020

(54) TECHNIQUES AND APPARATUSES FOR SYNCHRONIZATION DESIGN

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/020,564

(22) Filed: Jun. 27, 2018

(65) Prior Publication Data

US 2019/0109699 A1    Apr. 11, 2019

Related U.S. Application Data

(60) Provisional application No. 62/569,418, filed on Oct. 6, 2017.

(51) Int. Cl.
*H04L 7/10* (2006.01)
*H04L 5/00* (2006.01)
(Continued)

(52) U.S. Cl.
CPC .............. *H04L 7/10* (2013.01); *H04J 11/0086* (2013.01); *H04L 5/005* (2013.01); *H04L 7/041* (2013.01); *H04L 27/261* (2013.01); *H04L 27/2662* (2013.01); *H04B 7/2662* (2013.01); *H04J 11/0069* (2013.01)

(58) Field of Classification Search
CPC ....... H04L 67/12; H04L 5/0053; H04L 63/10; H04L 63/1425; H04L 63/20; H04L 1/1812; H04L 63/0428; H04L 5/001; H04L 5/0039; H04L 5/005; H04L 63/0876;
(Continued)

(56) References Cited

U.S. PATENT DOCUMENTS

2017/0187563 A1* 6/2017 Shin .................... H04L 27/2675

OTHER PUBLICATIONS

Apple Inc: "Signaling of SS Block Index", 3GPP Draft; R1-1710905 Signaling of SS Block Index, 3rd Generation Partnership Project (3GPP), Mobile Competence Centre, 650, Route Des Lucioles, F-06921 Sophia-Antipolis Cedex, France, vol. RAN WG1. No. Hangzhou; Jun. 27, 2017-Jun. 30, 2017, Jun. 26, 2017 (Jun. 26, 2017), XP051300106, 6 Pages, Retrieved from the Internet: URL: http://www.3gpp.org/ftp/Meetings_3GPP_SYNC/RAN1/Docs/ [retrieved on Jun. 26, 2017].
(Continued)

*Primary Examiner* — Natasha W Cosme
(74) *Attorney, Agent, or Firm* — Nerrie M. Zohn

(57) ABSTRACT

Some techniques and apparatuses described herein provide synchronization signal numerology, coverage extension/repetition schemes, and synchronization signal burst set periodicities for 5G IoT user equipment (UEs). For example, some techniques and apparatuses described herein provide a sequence of slots and/or particular symbols within a slot for transmission of a synchronization signal and/or a broadcast channel. Furthermore, some techniques and apparatuses described herein define minimum bandwidths of IoT UEs in relation to non-IoT UEs, and define synchronization signal burst set periodicities that may be different for IoT UEs than for non-IoT UEs.

30 Claims, 15 Drawing Sheets

(51) Int. Cl.
  *H04L 27/26* (2006.01)
  *H04J 11/00* (2006.01)
  *H04L 7/04* (2006.01)
  *H04B 7/26* (2006.01)

(58) Field of Classification Search
  CPC . H04L 63/102; H04L 63/1458; H04L 1/0003; H04L 47/2466
  USPC .......................................................... 370/350
  See application file for complete search history.

(56) References Cited

OTHER PUBLICATIONS

Huawei., et al., "WF on SS Burst Set Composition and SS—Block Index Indication", 3GPP Draft; R1-1703832 WF on SS Burst Set Composition and SS—Block Index Indication_V4, 3rd Generation Partnership Project (3GPP), Mobile Competence Centre, 650, Route Des Lucioles, F-06921 Sophia-A, vol. RAN WG1. No. Athens, Greece; Jan. 13, 2017-Jan. 17, 2017, Feb. 16, 2017 (Feb. 16, 2017), XP051236632, 7 Pages, Retrieved from the Internet: URL: http://www.3gpp.org/ftp/tsg_ran/WG1_RL1/TSGR1_88/Docs/ [retrieved on Feb. 16, 2017]. [retrieved on Feb. 16, 2017].

International Search Report and Written Opinion—PCT/US2018/051533—ISA/EPO—dated Feb. 4, 2019.

NTT Docomo, et al., "Discussion on SS Block Composition, SS Burst Set Composition and SS Block Index Indication for NR", 3GPP Draft; R1-1705705_Discussion on SS Block_Burst Set Composition and SS Block Index Indication for NR_FINAL2, 3rd Generation Partnership Project (3GPP), vol. RAN WG1, No. Spokane, USA; Apr. 3, 2017-Apr. 7, 2017, Apr. 2, 2017 (Apr. 2, 2017), XP051243820, 8 Pages, Retrieved from the Internet: URL: http://www.3gpp.org/ftp/Meetings_3GPP_SYNC/RAN1/Docs/ [retrieved on Apr. 2, 2017].

* cited by examiner

TECHNIQUES AND APPARATUSES FOR SYNCHRONIZATION DESIGN

CROSS-REFERENCE TO RELATED APPLICATIONS UNDER 35 U.S.C. § 119

This application claims priority to Provisional Patent Application No. 62/569,418, filed on Oct. 6, 2017, entitled "TECHNIQUES AND APPARATUSES FOR SYNCHRONIZATION DESIGN FOR 5G INTERNET OF THINGS USER EQUIPMENT," which is hereby expressly incorporated by reference herein.

BACKGROUND

Field

Aspects of the present disclosure generally relate to wireless communication, and more particularly to techniques and apparatuses for synchronization design for an Internet of Things (IoT) device.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

Low-cost and/or low-power UEs provide many benefits in certain applications, such as machine type communication (MTC) applications, Internet of Things (IoT) applications, and/or the like. One type of low-cost UE is the narrowband IoT (NB-IoT) UE, which is being implemented using the LTE radio access technology. The NB-IoT UE may use a narrow bandwidth and a single-tone uplink connection. Furthermore, the NB-IoT UE may use a simplified communication protocol in comparison to a non-NB-IoT UE, and may use a transmission time interval (TTI) bundling technique for coverage extension.

SUMMARY

The adoption of a low-power and/or low-cost communication structure may provide many benefits. For example, adopting an approach similar to NB-IoT may provide increased coverage, a flexible data rate for low-power UEs, lower power consumption, and lower cost. However, there may be challenges with implementing an approach similar to NB-IoT. For example, NB-IoT devices may use a different numerology than other 5G/NR devices. Furthermore, a typical broadcast channel (e.g., physical broadcast channel (PBCH)) and/or synchronization signal block structure for 5G may not provide sufficient coverage extension for NB-IoT devices in the 5G band. As another example, bandwidths of NB-IoT devices can potentially be different than bandwidths of non-NB-IoT devices (e.g., 5G/NR devices). As a third example, synchronization signal burst set periodicities of NB-IoT devices can be different than those of non-NB-IoT devices.

Some techniques and apparatuses described herein provide synchronization signal (SS) numerology, coverage extension/repetition schemes, and synchronization signal burst set periodicities for 5G IoT UEs. For example, some techniques and apparatuses described herein provide a sequence of slots and/or particular symbols within a slot for transmission of a synchronization signal and/or a broadcast channel. Furthermore, some techniques and apparatuses described herein define minimum bandwidths of IoT UEs in relation to non-IoT UEs, and define synchronization signal burst set periodicities that may be different for IoT UEs than for non-IoT UEs. In this way, implementation of NB-IoT-like UEs in 5G is enabled, thereby providing cost and power savings, increasing efficiency of network resources, and improving versatility of the 5G network.

In an aspect of the disclosure, a method, an apparatus, an IoT UE, a base station, and a computer program product are provided.

In some aspects, the method, performed by the IoT UE, may include receiving a synchronization signal (SS) block, wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and performing synchronization using the SS block.

In some aspects, the IoT UE may include a memory and at least one processor coupled to the memory. The at least one processor may be configured to receive a synchronization signal (SS) block, wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and perform synchronization using the SS block.

In some aspects, the apparatus may include means for receiving a synchronization signal (SS) block, wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and means for performing synchronization using the SS block.

In some aspects, the computer program product may include a non-transitory computer-readable medium storing computer executable code. The code may include code for receiving a synchronization signal (SS) block, wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and code for performing synchronization using the SS block.

In some aspects, the method, performed by the base station, may include transmitting a synchronization signal (SS) block for an Internet of Things (IoT) user equipment (UE), wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and performing synchronization with the IoT UE using the SS block.

In some aspects, the base station may include a memory and at least one processor coupled to the memory. The at least one processor may be configured to transmit a synchronization signal (SS) block for an Internet of Things (IoT) user equipment (UE), wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and perform synchronization with the IoT UE using the SS block.

In some aspects, the apparatus may include means for transmitting a synchronization signal (SS) block for an Internet of Things (IoT) user equipment (UE), wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and means for performing synchronization with the IoT UE using the SS block.

In some aspects, the computer program product may include a non-transitory computer-readable medium storing computer executable code. The code may include code for transmitting a synchronization signal (SS) block for an Internet of Things (IoT) user equipment (UE), wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block; and code for performing synchronization with the IoT UE using the SS block Aspects generally include a method, apparatus, system, computer program product, non-transitory computer-readable medium, user equipment, IoT UE, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
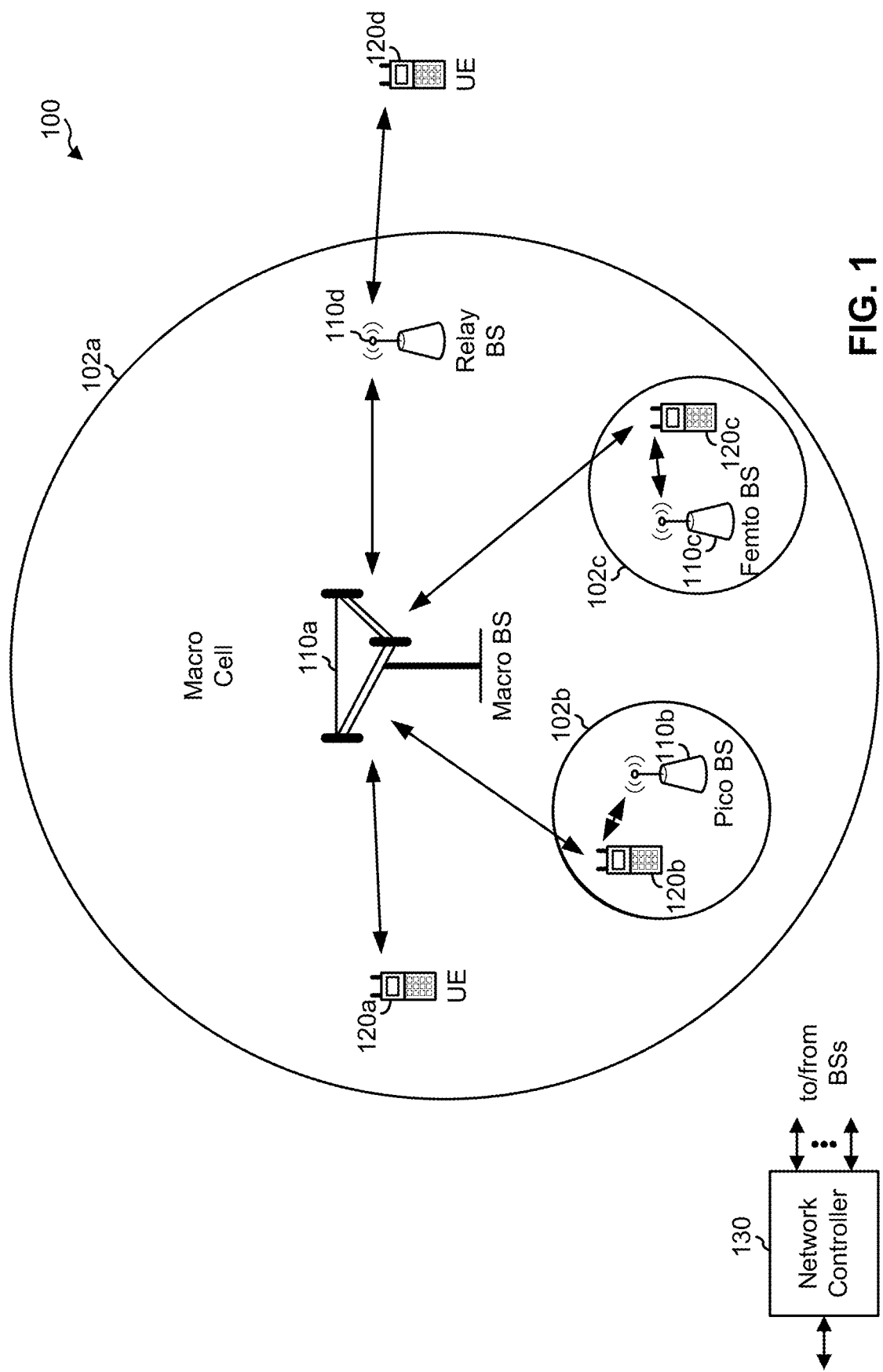
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

Some UEs may be considered Internet-of-Things (IoT) devices, and/or may be implemented as may be implemented as NB-IoT (narrowband internet of things) devices. Some techniques and apparatuses described herein provide SS/PBCH block structures for synchronization of IoT UEs in a 5G network, and/or provide techniques for selection of bandwidth, subcarrier spacing, and/or the like for such IoT UEs. UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed. 5G RAT networks may have more flexible bandwidth, slot size, and subcarrier spacing, which may be collectively termed numerology. Techniques and apparatuses described herein may provide for communication with an IoT UE using a 5G RAT network by transmitting an SS and/or broadcast channel block for an IoT UE, wherein the SS and/or broadcast channel block includes at least three consecutive slots, and wherein at least one of a bandwidth or a subcarrier spacing of the SS and/or broadcast channel block is based at least in part on a frequency band of the SS and/or broadcast channel block; and performing synchronization with the IoT UE based at least in part on the SS and/or broadcast channel block.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
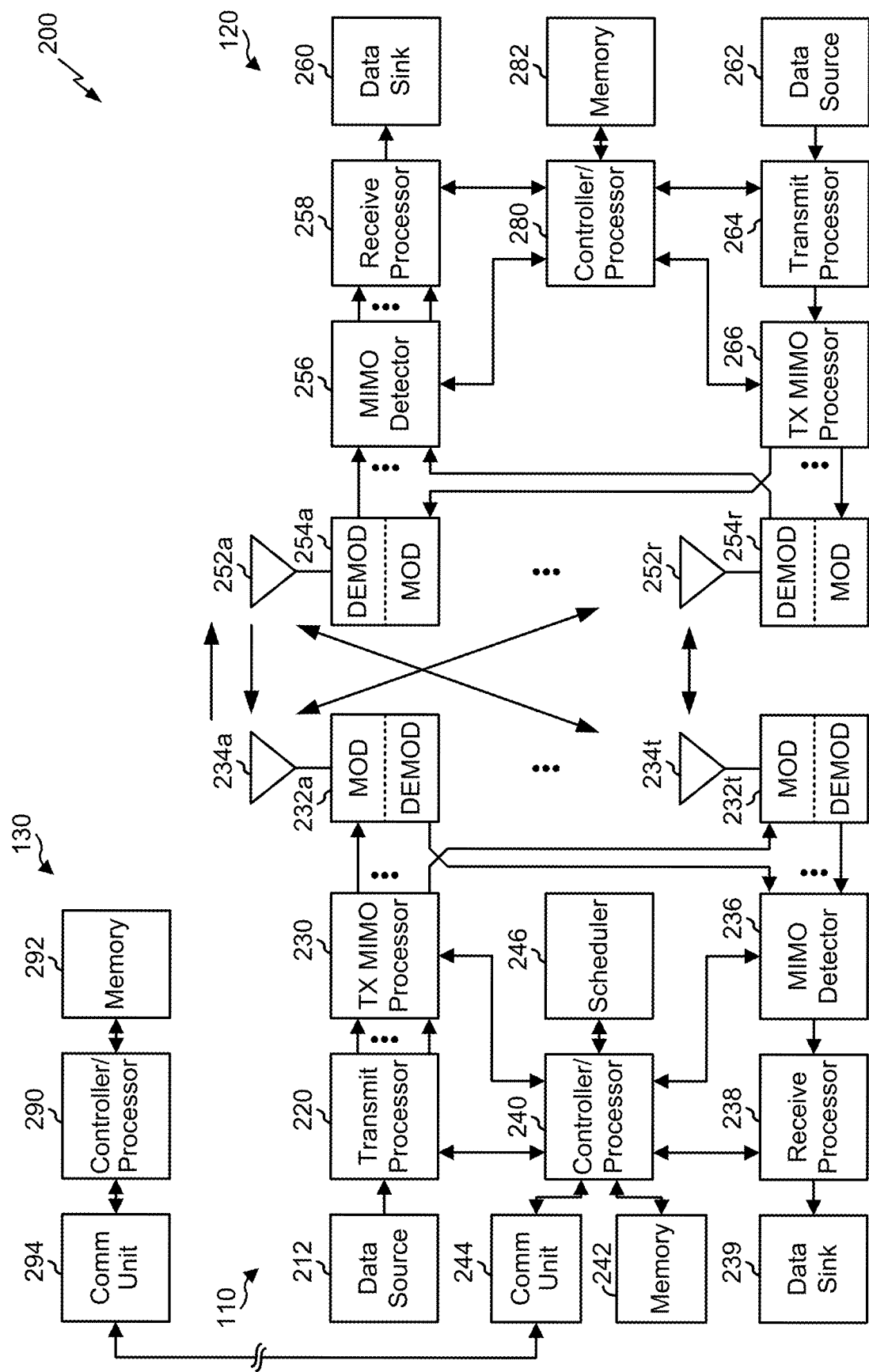
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)), synchronization signals (e.g., the primary synchronization signal (PSS) and secondary synchronization signal (SSS)), and a broadcast channel (e.g., PBCH, etc.). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals and/or broadcast channel may be transmitted in at least three consecutive slots based at least in part on a frequency band in which the UE 120 operates.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform one or more techniques associated with synchronization design for 5G IoT UEs, as described in more detail elsewhere herein. For example, controller/processor 240 of BS 110, controller/processor 280 of UE 120, and/or any other component(s) of FIG. 2 may perform or direct operations of, for example, method 900 of FIG. 9, method 1000 of FIG. 10, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize orthogonal frequency division multiplexing (OFDM) with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using time division duplexing (TDD). 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The radio access network (RAN) may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
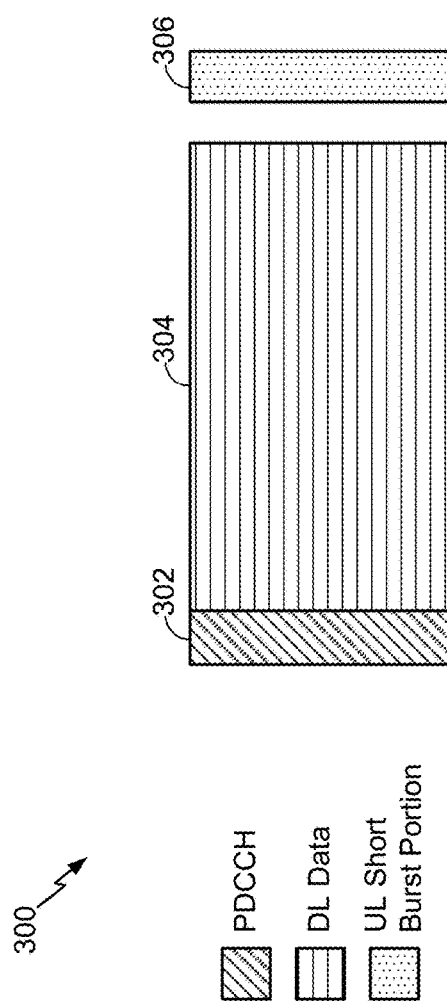
FIG. 3 is a diagram illustrating an example of a downlink (DL)-centric wireless communication structure.

FIG. 3 is a diagram 300 showing an example of a DL-centric subframe or wireless communication structure. The DL-centric subframe may include a control portion 302. The control portion 302 may exist in the initial or beginning portion of the DL-centric subframe. The control portion 302 may include various scheduling information and/or control information corresponding to various portions of the DL-centric subframe. In some configurations, the control portion 302 may be a physical DL control channel (PDCCH), as indicated in FIG. 3.

The DL-centric subframe may also include a DL data portion 304. The DL data portion 304 may sometimes be referred to as the payload of the DL-centric subframe. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH). In some aspects, the DL data portion 304 may carry a synchronization signal or PBCH for one or more UEs, such as a 5G IoT UE and/or the like.

The DL-centric subframe may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric subframe. For example, the UL short burst portion 306 may include feedback information corresponding to the control portion 302 and/or the DL data portion 304. Non-limiting examples of information that may be included in the UL short burst portion 306 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access block (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 3 is provided merely as an example. Other examples are possible and may differ from what was described with regard to FIG. 3.

Figure 4:
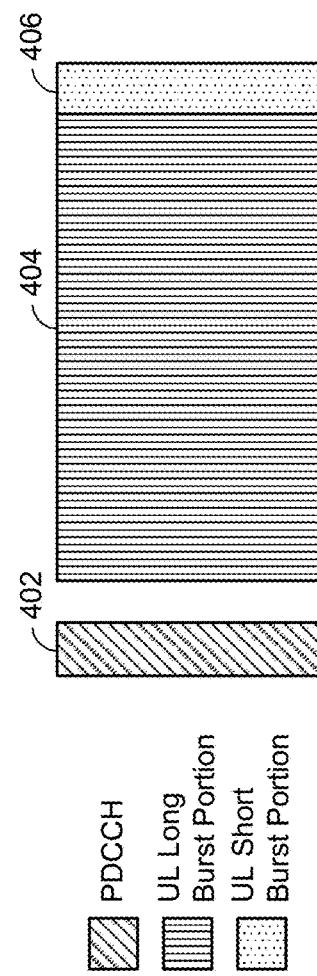
FIG. 4 is a diagram illustrating an example of an uplink (UL)-centric wireless communication structure.

FIG. 4 is a diagram 400 showing an example of an UL-centric subframe or wireless communication structure. The UL-centric subframe may include a control portion 402. The control portion 402 may exist in the initial or beginning portion of the UL-centric subframe. The control portion 402 in FIG. 4 may be similar to the control portion 302 described above with reference to FIG. 3. In some configurations, the control portion 402 may be a physical DL control channel (PDCCH).

The UL-centric subframe may also include an UL long burst portion 404. The UL long burst portion 404 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure and alternative structures having similar features may exist without necessarily deviating from the aspects described herein.

As indicated above, FIG. 4 is provided merely as an example. Other examples are possible and may differ from what was described with regard to FIG. 4.

Figure 5:
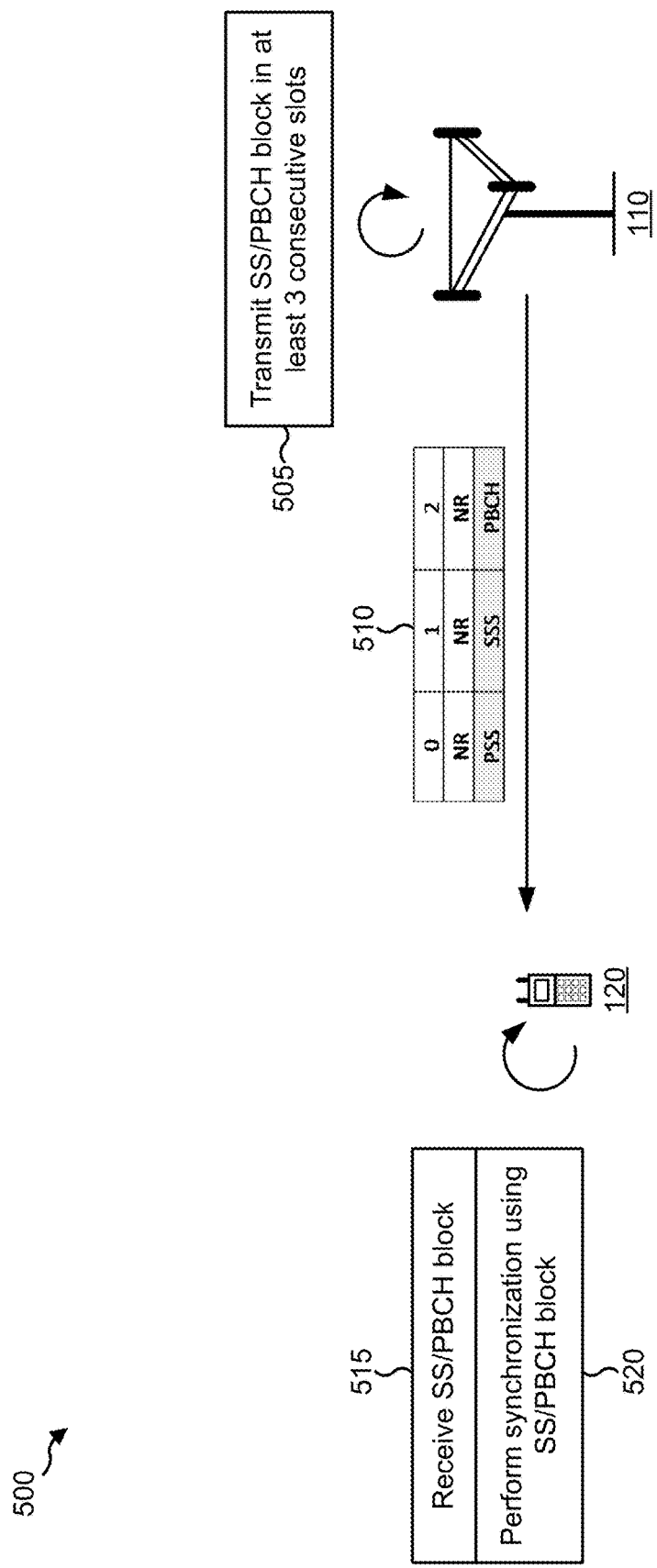
FIG. 5 is a diagram illustrating an example of a synchronization process.

FIG. 5 is a diagram illustrating an example 500 of synchronization for a 5G IoT UE. As shown, FIG. 5 includes an IoT UE 120 (e.g., a 5G IoT UE) and a BS 110. As shown in FIG. 5, and by reference number 505, the BS 110 may transmit an SS/PBCH block in at least three consecutive slots. As used herein, "SS/PBCH block" is interchangeable with "SS and/or broadcast channel block," "PBCH block," "SS or broadcast channel block," "SS block," and the like.

As shown by reference number 510, the SS/PBCH block may include a PSS, an SSS, and/or a PBCH. The top row of the table shown by reference number 510 may identify a slot number, the second row of the table may indicate the NR downlink data portion sent by FDM with the SS/PBCH band in the same symbols of the same slots of the SS/PBCH, and the bottom row may indicate relative positions of the PSS, the SSS, and the PBCH in the three consecutive slots.

As further shown, the PSS, the SSS, and the PBCH may be time division multiplexed. In cases wherein the SS/PBCH block is transmitted in three consecutive slots, the synchronization signals and the PBCH may be multiplexed in any order (e.g., PSS-SSS-PBCH, PSS-PBCH-SSS, PBCH-SSS-PSSS, SSS-PBCH-PSS, etc.). In cases wherein the SS/PBCH block is transmitted in four consecutive slots, the PBCH may have two symbols with lower coding rate or one more additional repeated symbol, and the synchronization signal and the PBCHs may be multiplexed in any order (e.g., PSS-PBCH-SSS-PBCH, PSS-SSS-PBCH-PBCH, PBCH-SSS-PBCH-PSS, etc.). In some aspects, each slot may include 14 symbols, and the PSS, SSS, and PBCH may occupy a subset of the 14 symbols, as described in more detail below.

In some aspects, the SS/PBCH block may be associated with a particular numerology, e.g., subcarrier spacing and cyclic prefix. For example, the SS/PBCH block may be associated with a normal cyclic prefix (NCP) for 5G. In some aspects, the subcarrier spacing of the SS/PBCH block may be based at least in part on a frequency band in which the SS/PBCH block is transmitted. For example, the subcarrier spacing or several candidates of the subcarrier spacing(s) may be pre-defined for each frequency band. In such a case, the subcarrier spacing may be the same as a subcarrier spacing for a 5G (e.g., non-IoT UE) SS/PBCH block in the frequency band.

In some aspects, the subcarrier spacing may be different than a subcarrier spacing for a 5G (e.g., non-IoT UE) SS/PBCH block in the frequency band. For example, the subcarrier spacing may be one-half of the subcarrier spacing for the 5G SS/PBCH block, and a symbol length of the SS/PBCH block for the IoT UE 120 may be doubled. This may be more robust with regard to timing drift. For example, if a subcarrier spacing for the 5G SS/PBCH block in a frequency band under 6 GHz is 30 kHz, a subcarrier spacing for the IoT UE 120 may be 15 kHz. Additionally, or alternatively, if a subcarrier spacing for the 5G SS/PBCH block in a frequency band above 6 GHz is 240 kHz, a subcarrier spacing for the IoT UE 120 may be 120 kHz.

In some aspects, the subcarrier spacing may be configurable in each frequency band. In such a case, the subcarrier spacing may be configured to be the same as a subcarrier spacing for a 5G (e.g., non-IoT UE) PDSCH sent by the same cell and multiplexed in the same slot in the frequency band, which may be compatible with an existing PDSCH structure without using a guard band to avoid inter-carrier interference. In some aspects, the subcarrier spacing may be configured to be different than a subcarrier spacing for a 5G PDSCH in the frequency band. For example, the subcarrier spacing may be configured to be one-half of the subcarrier spacing for the 5G PDSCH, which may provide increased robustness with regard to timing drift.

In some aspects, the IoT UE 120 may be associated with a particular minimum bandwidth. For example, the minimum bandwidth of the IoT UE 120 may be equal to 1 resource block (RB) (e.g., 12 subcarriers) in the 5G band. In some aspects, the minimum bandwidth of the IoT UE 120 may be equal to 3 RBs or 6 RBs in the NR band. In some aspects, the IoT UE 120 may have a downlink bandwidth that is equal to an uplink bandwidth of the IoT UE 120. In some aspects, the downlink bandwidth may be different than the uplink bandwidth. For example, the downlink bandwidth may be wider than the uplink bandwidth when a frequency band of the downlink is below 6 GHz. Additionally, or alternatively, a frequency band of the uplink may be below 6 GHz, and a frequency band of the downlink may be above 6 Ghz. Notably, when the minimum bandwidth is expressed in MHz, the minimum bandwidth may be different for different frequency bands due to different numerologies of the different frequency bands.

As shown by reference number 515, the IoT UE 120 may receive the SS/PBCH block. In some aspects, the IoT UE 120 may receive multiple, different repetitions of the SS/PBCH block (e.g., based at least in part on beam sweeping and/or based at least in part on a synchronization signal burst set periodicity), as described in more detail below.

As shown by reference number 520, the IoT UE 120 may perform synchronization and get the minimum system information (MIB) using the SS/PBCH block. For example, the IoT UE 120 may identify the BS 110 based at least in part on the PSS, SSS, and/or PBCH. Additionally, or alternatively, the IoT UE 120 may determine timing information and/or a timing offset of the BS 110 based at least in part on the PSS, SSS, and/or PBCH. In this way, the IoT UE 120 synchronizes with the BS 110 according to an SS/PBCH block that is transmitted in at least three consecutive slots.

As indicated above, FIG. 5 is provided as an example. Other examples are possible and may differ from what was described with respect to FIG. 5.

Figure 6:
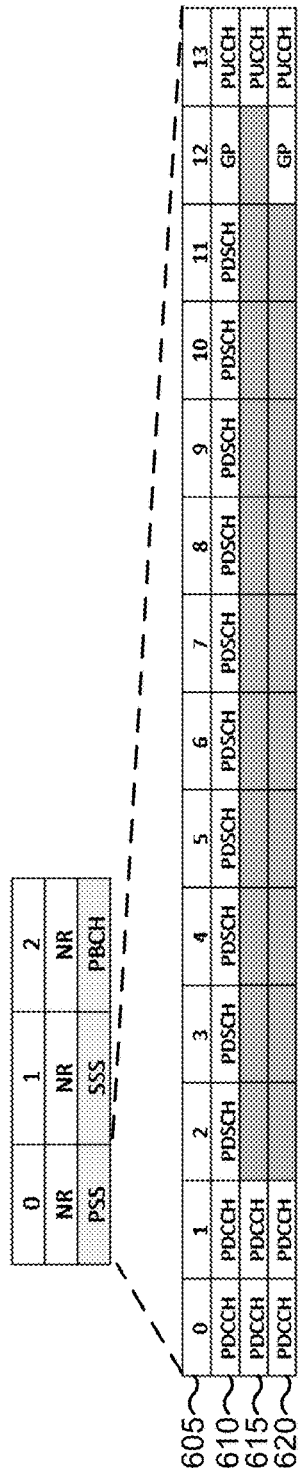
FIG. 6 is a diagram illustrating an example of a slot and symbol structure for a synchronization signal or broadcast channel block.

FIG. 6 is a diagram illustrating an example 600 of a slot and symbol structure for a synchronization signal or broadcast channel block for a 5G IoT UE. FIG. 6 shows a symbol structure for slot 0 of the three consecutive slots described in connection with FIG. 5, above. However, the symbol structure shown in FIG. 6 can be used for any synchronization signal or PBCH and for any slot index.

Reference number 605 shows symbol indices, and reference number 610 shows symbol allocations for a 5G (e.g., non-IoT) UE. As shown by reference number 610, symbols 0 and 1 may be used for a PDCCH, symbols 2 through 11 may be used for a PDSCH, symbol 12 may be used for a guard period (e.g., to tune from the downlink frequency band to the uplink frequency band), and symbol 13 may be used for a PUCCH.

Reference number 615 shows a first symbol structure for the SS/PBCH block, wherein gray symbols are allocated for the SS/PBCH block. As shown by reference number 615, in some aspects, 11 symbols of the 14-symbol slot may be allocated for a synchronization signal or PBCH of the IoT UE 120. In this way, the synchronization signal or PBCH may not overlap with the PDCCH or PUCCH of the slot for 5G UEs that are multiplexed in the same slot. Furthermore, an 11-symbol narrowband PSS (NPSS) sequence, such as an LTE NPSS sequence, can be reused for the 5G IoT PSS sequence. Additionally, or alternatively, an 11-symbol narrowband SSS (NSSS) sequence, such as a 131-length Zadoff Chu sequence from LTE NB-IoT, can be used as a base sequence for the 5G IoT SSS sequence.

Reference number 620 shows a second symbol structure for the SS/PBCH block, wherein gray symbols are allocated for the SS/PBCH block. As shown by reference number 620, in some aspects, 10 symbols of the 14-symbol slot may be allocated for a synchronization signal or PBCH of the IoT UE 120. In this way, the synchronization signal or PBCH may not overlap with the PDCCH, PUCCH, or guard period for 5G UEs that are multiplexed in the same slot. In such a case, a truncated 10-symbol NPSS sequence from LTE can be used for the PSS of the IoT UE 120. Additionally, or alternatively, a 10-symbol sequence for the IoT UE 120 with 120 resource elements (REs) can be generated for the SSS (e.g., based at least in part on a 127-length Zadoff Chu sequence, or based at least on an extended 113-length Zadoff Chu sequence, or based at least in part on a 127-length Gold sequence, etc.).

As indicated above, FIG. 6 is provided as an example. Other examples are possible and may differ from what was described with respect to FIG. 6.

Figure 7A:
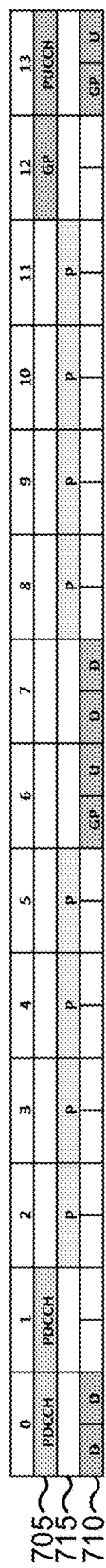
FIGS. 7A-7C are diagrams illustrating examples of slot and symbol structures for a synchronization signal or broadcast channel block.
Figure 7B:
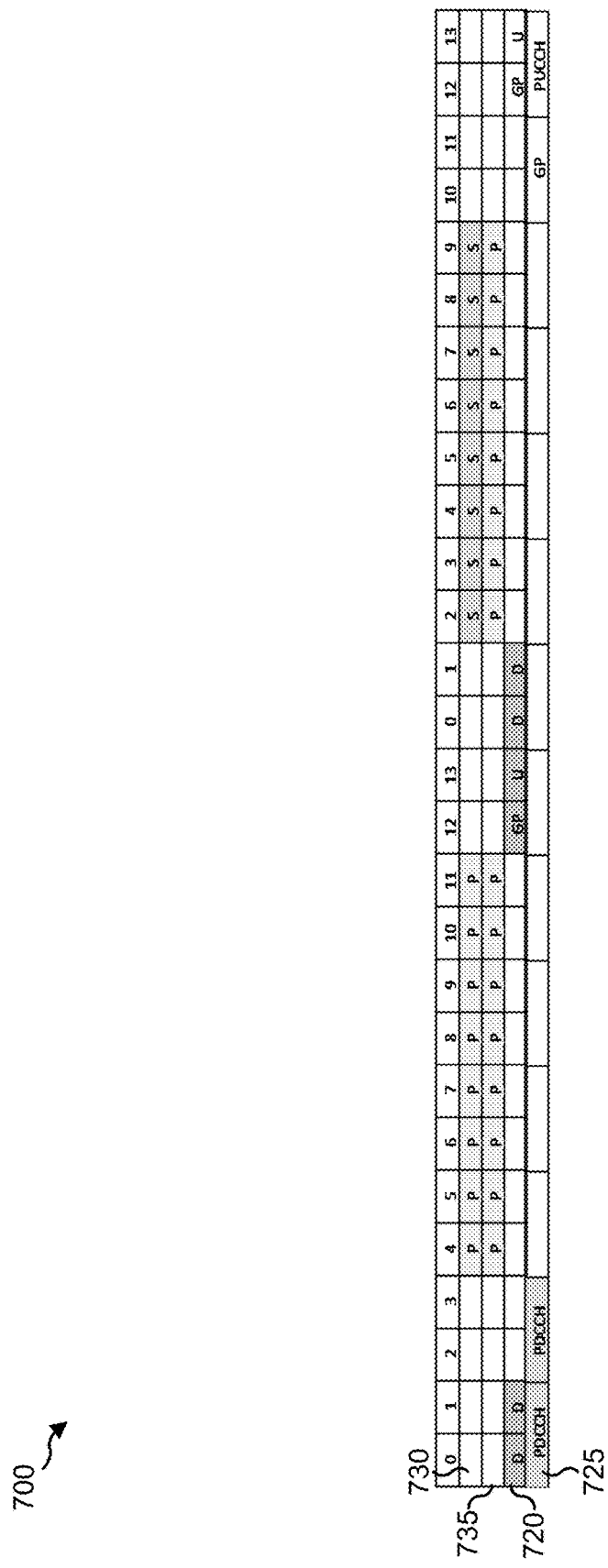
Figure 7C:
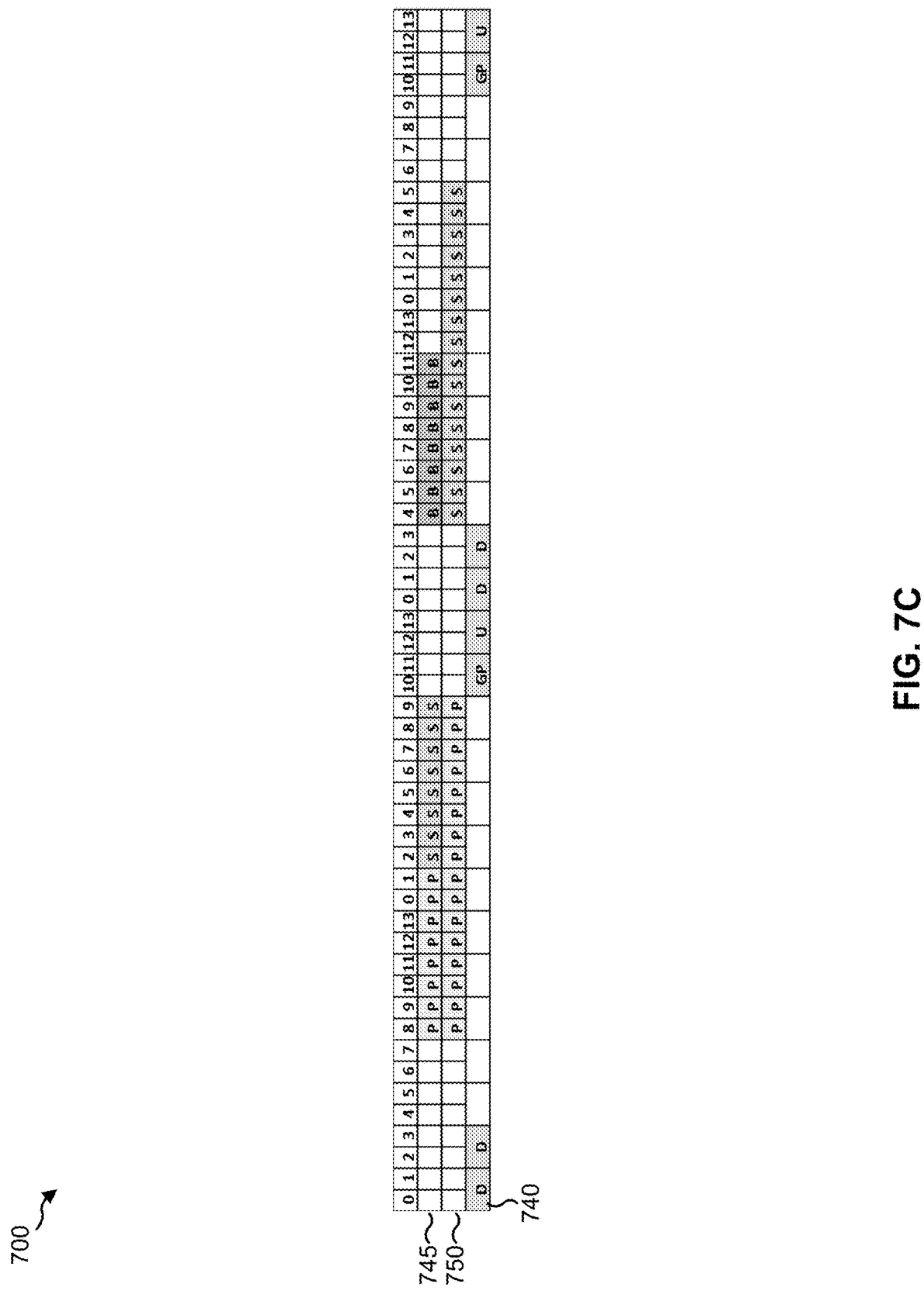

FIGS. 7A-7C are diagrams illustrating examples 700 of slot and symbol structures for a synchronization signal or broadcast channel block for a 5G IoT UE. FIGS. 7A-7C show examples wherein a predefined subcarrier spacing and normal cyclic prefix are used for each frequency band, and the subcarrier spacing can be different from that of a PDCCH or PDSCH multiplexed in the same frequency band.

FIG. 7A shows an example wherein a 15 kHz subcarrier spacing is used for the IoT UE 120, and wherein a 15 kHz or 30 kHz subcarrier spacing is used for a NR (e.g., non-IoT) data transmission multiplexed with the IoT UE 120. In FIG. 7A, a top row of the table identifies symbol indices of a slot with a 15 kHz subcarrier spacing. Reference number 705 identifies symbol allocations for a NR data transmission with a 15 kHz subcarrier spacing, wherein symbols 0 and 1 are allocated for a PDCCH, symbol 12 is allocated for a guard period, and symbol 13 is allocated for a PUCCH.

Reference number 710 identifies symbol allocations for a NR data transmission with a 30 kHz subcarrier spacing. As shown by reference number 710, two symbols with the 30 kHz subcarrier spacing may be allocated for a PDCCH (represented by the letter D) in a same space as symbol of the NR data transmission shown by reference number 705. Furthermore, guard periods (shown as GP) and a PUCCH (shown as U) may be allocated in various symbols.

Reference number 715 identifies symbol allocations for a synchronization signal and/or PBCH for the IoT UE 120 with a 15 kHz subcarrier spacing. As shown, 8 symbols of the 14-symbol slot are allocated for the synchronization signal or PBCH, and the 8 symbols do not overlap control symbols or guard periods of the NR data transmissions with the 15 kHz subcarrier spacing or the 30 kHz subcarrier spacing. In FIG. 7A, the 8 symbols are allocated for the PSS (indicated by P), but the allocation illustrated in FIG. 7A is also applicable for the SSS or PBCH.

FIG. 7B shows an example wherein a 30 kHz subcarrier spacing is used for the IoT UE 120, wherein a 30 kHz subcarrier spacing is used for a first NR data transmission (shown by reference number 720), and wherein a 15 kHz subcarrier spacing is used for a second NR data transmission (shown by reference number 725). As further shown, FIG. 7B illustrates two consecutive slots with the 30 kHz subcarrier spacing, which correspond to a single slot with the 15 kHz subcarrier spacing. FIG. 7B can also be applied to a frequency band above 6 GHz wherein a 120 kHz subcarrier spacing is used for the IoT UE 120, wherein a 120 kHz subcarrier spacing is used for a first NR data transmission (shown by reference number 720), and wherein a 60 kHz subcarrier spacing is used for a second NR data transmission (shown by reference number 725). As further shown, FIG. 7B illustrates two consecutive slots with the 120 kHz subcarrier spacing, which correspond to a single slot with the 60 kHz subcarrier spacing.

As shown by reference number 730, a first symbol allocation may allocate 8 symbols of each 14-symbol slot to a different synchronization signal or PBCH. For example, here, the first slot includes 8 symbols allocated to the PSS of the IoT UE 120 (shown as P) and the second slot includes 8 symbols allocated to the SSS of the IoT UE 120 (shown as S). This allocation is also applicable with regard to the PBCH. Allocating sets of 8 consecutive symbols may improve a speed of synchronization of the IoT UE 120.

As shown by reference number 735, a second symbol allocation may allocate 16 symbols of two consecutive 14-symbols slots to a single synchronization signal or PBCH. Here, the first and second slots each includes 8 symbols allocated to the PSS of the IoT UE 120. This may provide increased repetition, thereby improving coverage of the IoT UE 120 and enabling synchronization for IoT UEs associated with the 15 kHz or 60 kHz subcarrier spacing in different frequency bands.

FIG. 7C shows an example wherein a 240 kHz subcarrier spacing is used for the IoT UE 120, and wherein a 120 kHz subcarrier spacing is used for the NR data transmission. The NR data transmission is shown by reference number 740.

As shown by reference number 745, a first symbol allocation may allocate a first 8 symbols of one or more slots to a first synchronization signal or PBCH, a second 8 symbols of the one or more slots to a second synchronization signal or PBCH, and a third 8 symbols of the one or more slots to a first or second synchronization signal or PBCH. Here, the first 8 symbols are allocated to a PSS, the second 8 symbols are allocated to an SSS, and the third 8 symbols are allocated to a PBCH (indicated by B). As shown, the allocated symbols do not overlap resources associated with the NR data transmission.

As shown by reference number 750, a second symbol allocation may allocate a first 16 symbols to a first synchronization signal or PBCH, may allocate a second 16 symbols to a second synchronization signal or PBCH, and so on. Here, the first 16 symbols are allocated for the PSS, and the second 16 symbols are allocated for the SSS. This may provide increased repetition, thereby improving coverage of the IoT UE 120 and enabling synchronization for IoT UEs associated with the 120 kHz subcarrier spacing as well as IoT UEs associated with the 240 kHz spacing.

As indicated above, FIGS. 7A-7C are provided as examples. Other examples are possible and may differ from what was described with respect to FIGS. 7A-7C.

Figure 8:
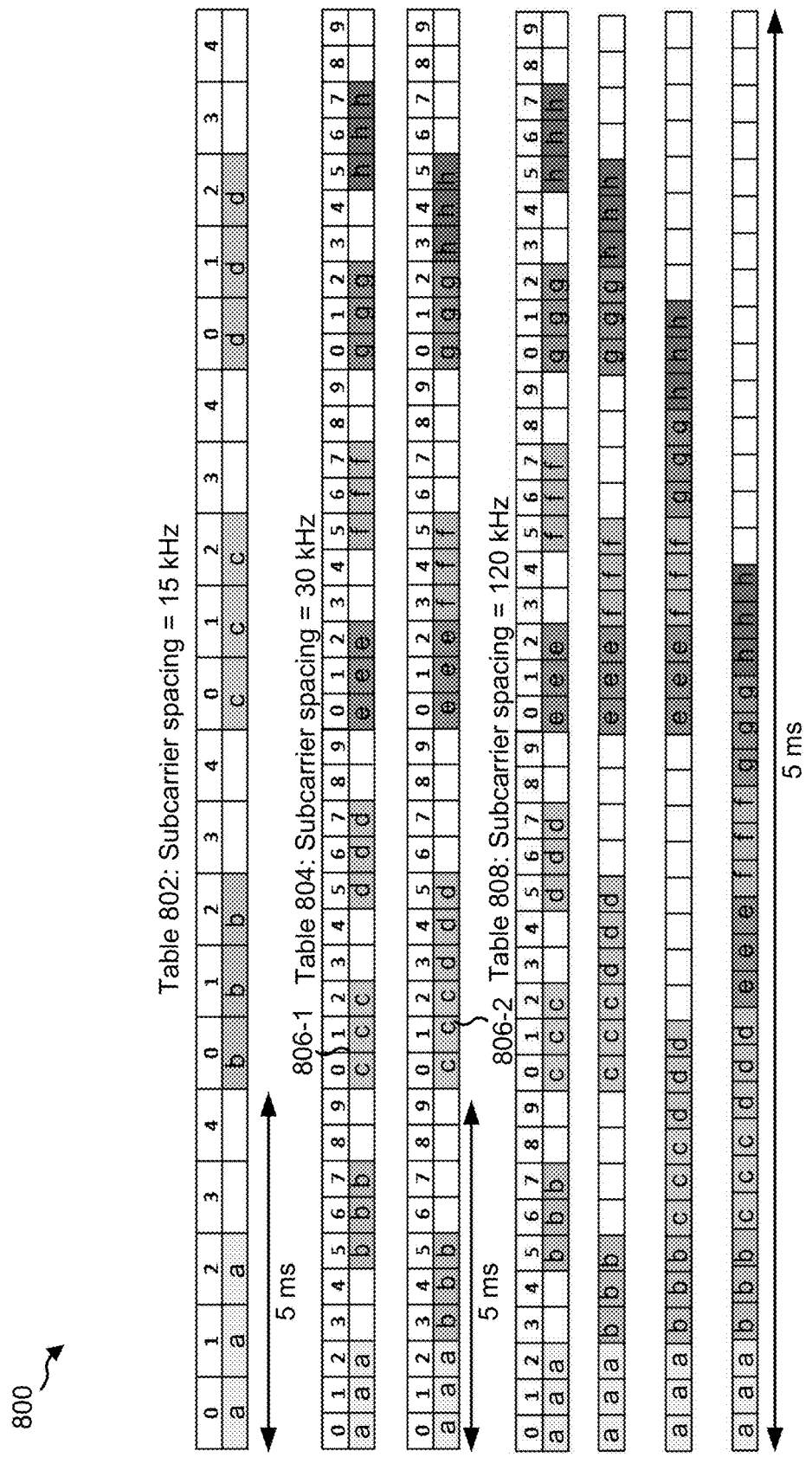
FIG. 8 is a diagram illustrating an example of beam sweeping structures for synchronization signal or broadcast channel blocks.

FIG. 8 is a diagram illustrating an example 800 of beam sweeping structures for synchronization signal or broadcast channel blocks for a 5G IoT UE. In FIG. 8, the top row of each table indicates a slot index. For example, and as shown, table 802 corresponds to a 15 kHz subcarrier spacing, and slot indexes 0, 1, 2, 3, and 4 are used, wherein the slot indexes repeat every 5 ms. Each shaded cluster of three blocks indicates an SS/PBCH block in three consecutive slots, and the letter included in the shaded cluster of three blocks indicates a beam index of a beam used to transmit the SS/PBCH block. For example, and as shown, table 802 includes four SS/PBCH blocks, which are each transmitted in a different 5 ms time window, and which are each transmitted using a different beam.

As shown, in some aspects, a gap may be included in between two SS/PBCH blocks. For example, the gap may be used to transmit control information, data, or other information associated with the IoT UE 120 and/or another UE 120, such as information identifying a latency requirement for an IoT UE 120.

Table 804 identifies two beam sweeping structures for a 30 kHz subcarrier spacing. As shown, in the 30 kHz subcarrier spacing, each 5 ms time window includes two SS/PBCH blocks. For example, a first 5 ms time window, SS/PBCH blocks a and b are transmitted by two corresponding beams, in a second 5 ms time window, SS/PBCH blocks c and d are transmitted by two corresponding beams, and so on.

As shown by reference number 806-1, in some aspects, each of the SS/PBCH blocks may be separated by a gap of 2 slots. This may provide more frequent gaps in which to transmit other information at the cost of a longer synchronization latency to obtain synchronization signals for all beams. As shown by reference number 806-2, in some aspects, two or more SS/PBCH blocks within a same 5 ms time window may be consecutive with each other. This may reduce a synchronization latency and may introduce additional delay before transmission or reception of information in the gaps.

Table 808 identifies four beam sweeping structures for a 120 kHz subcarrier spacing. As shown, when the 120 kHz subcarrier spacing is used, eight SS/PBCH blocks may be transmitted in a 5 ms window. Furthermore, as shown by the three bottom rows of table 808, groups of two, four, or eight SS/PBCH blocks may be transmitted consecutively to each other. As the number of consecutive SS/PBCH blocks increases, synchronization latency may be reduced, but delay before transmission or reception of information in the gaps between the SS/PBCH blocks may increase.

The above beam sweeping structure may be expressed as a function of a number of SS/PBCH blocks and/or beams to be transmitted. For example, assume that 4*M beams are to be transmitted in a 20 ms time window. In that case, M beams (and M SS/PBCH blocks) may be transmitted in each 5 ms window. For example, for the 15 kHz subcarrier spacing, M may be equal to 1, as can be seen in table 802. For the 30 kHz subcarrier spacing, M may be equal to 2, as can be seen in table 804. For the 120 kHz subcarrier spacing, M may be equal to 8, as can be seen in table 808. For the 240 kHz subcarrier spacing, M may be equal to 16 (not shown).

In some aspects, the IoT UE 120 may be associated with a synchronization signal burst set periodicity. A synchronization signal burst set is a set of SS/PBCH blocks associated with a beam sweeping structure, such as one of the beam sweeping structures described above. In some aspects, the synchronization signal burst set periodicity of the IoT UE 120 may be larger than for a non-IoT UE. For example, the IoT UE 120 may use a periodicity of 20 ms for 4*M beams, and the BS 110 may transmit M beams every 5 ms for an initial access IoT UE 120. As another example, the IoT UE 120 may use a periodicity of 40 ms for 4*M beams, and the BS 110 may transmit M beams every 10 ms for an initial access IoT UE 120. This may provide for more robust beam sweeping than a non-IoT UE 120. In some aspects, a connected-mode or idle-mode IoT UE 120 may use a particular synchronization signal burst set periodicity, such as 20 ms, 40 ms, 80 ms, 160 ms, and/or the like.

As indicated above, FIG. 8 is provided as an example. Other examples are possible and may differ from what was described with respect to FIG. 8.

Figure 9:
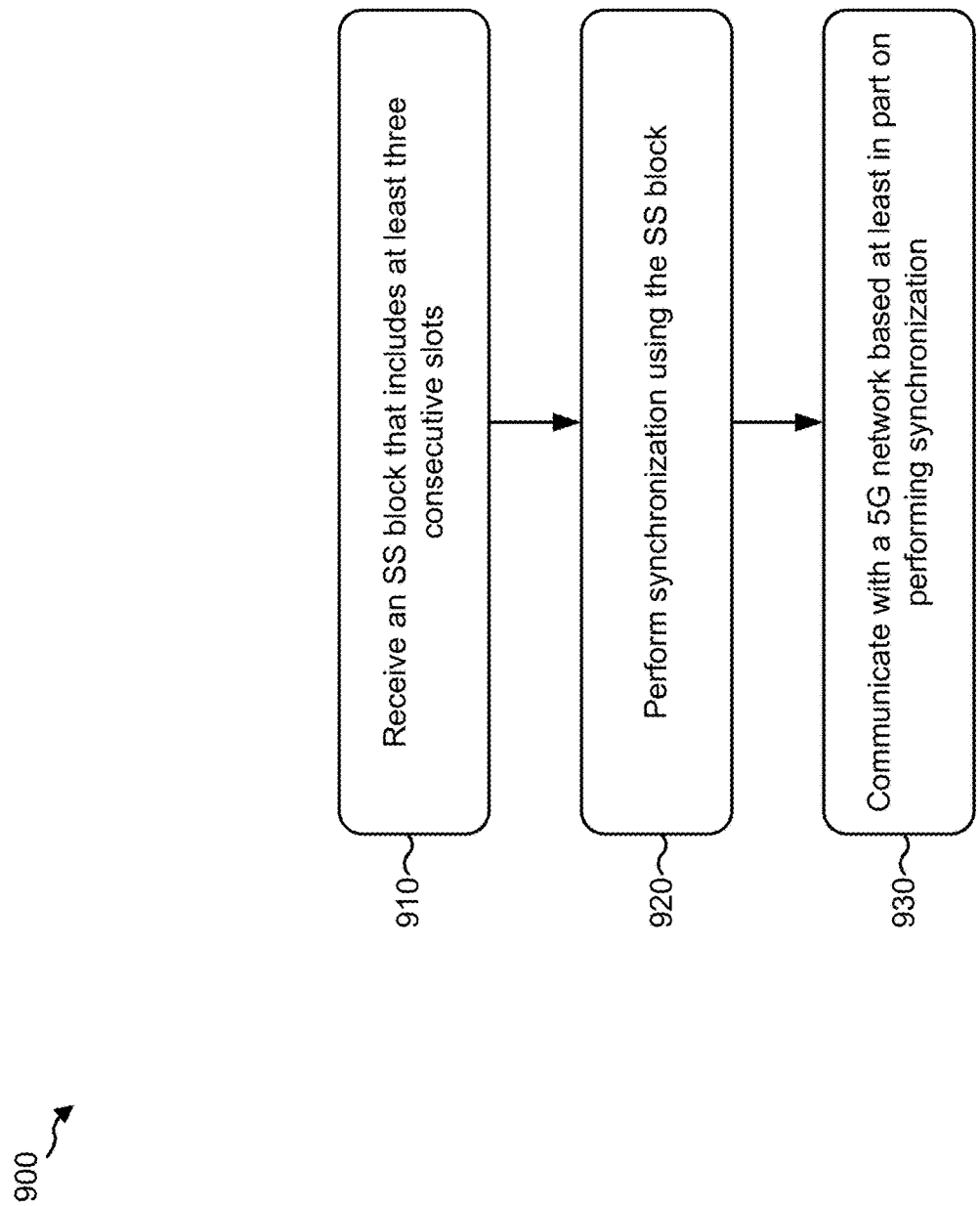
FIG. 9 is a flow chart of a method of wireless communication.

FIG. 9 is a flow chart of a method 900 of wireless communication. The method may be performed by an IoT UE (e.g., the UE 120 of FIG. 1, the IoT UE 120 of FIGS. 5-8, the apparatus 1102/1102', a 5G IoT UE, and/or the like).

At 910, the IoT UE may receive an SS block that includes at least three consecutive slots. For example, the IoT UE may receive an SS block, such as an SS and/or broadcast channel block, which is sometimes referred to herein as a SS/PBCH block. The SS/PBCH block may include at least three slots, and an SSS, a PSS, and/or a PBCH may be included in the at least three slots. In some aspects, at least one of a bandwidth or a subcarrier spacing of the SS and/or broadcast channel block may be based at least in part on a frequency band of the SS and/or broadcast channel block. In some aspects, the IoT UE operates in a 5G band.

In some aspects, a minimum bandwidth of the IoT UE includes a single resource block in a 5G band. In some aspects, a minimum bandwidth of the IoT UE includes a multiple resource blocks in a 5G band. In some aspects, the subcarrier spacing is different than a subcarrier spacing of a non-IoT SS block in the frequency band. In some aspects, the subcarrier spacing of the SS and/or broadcast channel block is different than a subcarrier spacing for a downlink data channel in the frequency band.

In some aspects, a primary synchronization signal, a secondary synchronization signal, and a broadcast channel are each transmitted in a corresponding slot of the at least three consecutive slots. In some aspects, a first transmission of a broadcast channel and a retransmission of the broadcast channel are transmitted in the at least three consecutive slots.

In some aspects, a slot of the at least three consecutive slots includes fourteen symbols, and eleven symbols of the slot are used for the SS and/or broadcast channel block. In some aspects, a synchronization signal sequence associated with another radio access technology is used for a synchronization signal of the SS and/or broadcast channel block. In some aspects, a slot of the at least three consecutive slots includes fourteen symbols, and wherein ten symbols of the slot are used for the SS and/or broadcast channel block. In some aspects, a truncation of a synchronization signal sequence associated with another radio access technology is used for a synchronization signal of the SS and/or broadcast channel block.

In some aspects, eight symbols of a slot, of the at least three consecutive slots, are allocated to one of a synchronization signal or broadcast channel of the SS and/or broadcast channel block. In some aspects, the eight symbols do not overlap with a control symbol, a guard period symbol, or a data symbol of a data transmission associated with a different subcarrier spacing than the IoT UE. In some aspects, sixteen symbols of two consecutive slots, of the at least three consecutive slots, are allocated to one of a synchronization signal or broadcast channel of the SS and/or broadcast channel block. In some aspects, the sixteen symbols do not overlap with a control symbol, a guard period symbol, or a data symbol of a data transmission associated with a different subcarrier spacing than the IoT UE.

In some aspects, the SS and/or broadcast channel block is one of multiple SS and/or broadcast channel blocks, and each SS and/or broadcast channel block is associated with a different beam. In some aspects, the multiple SS and/or broadcast channel blocks are received within a time window, wherein a number of SS and/or broadcast channel blocks received within the time window is proportionate to the subcarrier spacing of the SS and/or broadcast channel block. In some aspects, a synchronization signal burst set periodicity of the IoT UE is shorter during initial access than during a connected mode or idle mode. In some aspects, a synchronization signal burst set periodicity of the IoT UE is longer than a synchronization signal burst set periodicity for a non-IoT UE.

In some aspects, the three slots are consecutive slots. In some aspects, the SS block is an Internet of Things (IoT) SS block, and the subcarrier spacing of the SS block is different than a subcarrier spacing for a non-IoT SS block in the frequency band. In some aspects, a first transmission of a broadcast channel and a retransmission of the broadcast channel are transmitted in the at least three consecutive slots. In some aspects, a slot of the at least three slots includes fourteen symbols, and wherein less than twelve symbols of the slot are used for the SS block. In some aspects, at least a portion of a synchronization signal sequence associated with a radio access technology different than one of the IoT UE is used for a synchronization signal of the SS block. In some aspects, a set of symbols of a slot, of the at least three slots, are allocated to one of a synchronization signal or broadcast channel of the SS block and wherein the set of symbols do not overlap with a control symbol, guard period symbol, or a data symbol of a data transmission. In some aspects, two consecutive slots, of the at least three slots, are allocated to one of the primary synchronization signal, the secondary synchronization signal, or the broadcast channel of the SS block, and wherein the primary synchronization signal, the secondary synchronization signal, or the broadcast channel does not overlap with a control symbol, a guard period symbol, or a data symbol of a data transmission for a non-IoT UE. In some aspects, the SS block is one of multiple SS blocks, and wherein each SS block is associated with a different beam. In some aspects, the multiple SS blocks are received within a time window, wherein a number of SS blocks received within the time window is proportionate to the subcarrier spacing of the SS block. In some aspects, a synchronization signal burst set periodicity of the IoT UE is shorter during a first mode than during a second mode. In some aspects, a synchronization signal burst set periodicity of the IoT UE is different than a synchronization signal burst set periodicity for a non-IoT UE.

At 920, the IoT UE may perform synchronization using the SS block. For example, the IoT UE may identify the base station based at least in part on a PSS, SSS, and/or PBCH of the SS block. Additionally, or alternatively, the IoT UE may determine timing information based at least in part on the PSS, SSS, and/or PBCH. By transmitting the SS block in at least three slots and configuring a subcarrier spacing of the SS block based at least in part on a frequency band of the IoT UE, the BS 110 improves coverage of the IoT UE and improves a likelihood of success of the synchronization.

At 930, the IoT UE may communicate with a 5G network based at least in part on performing synchronization. For example, the IoT UE may perform initial access with the BS to access the 5G network, may enter a connected mode with regard to the 5G network, and/or the like.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
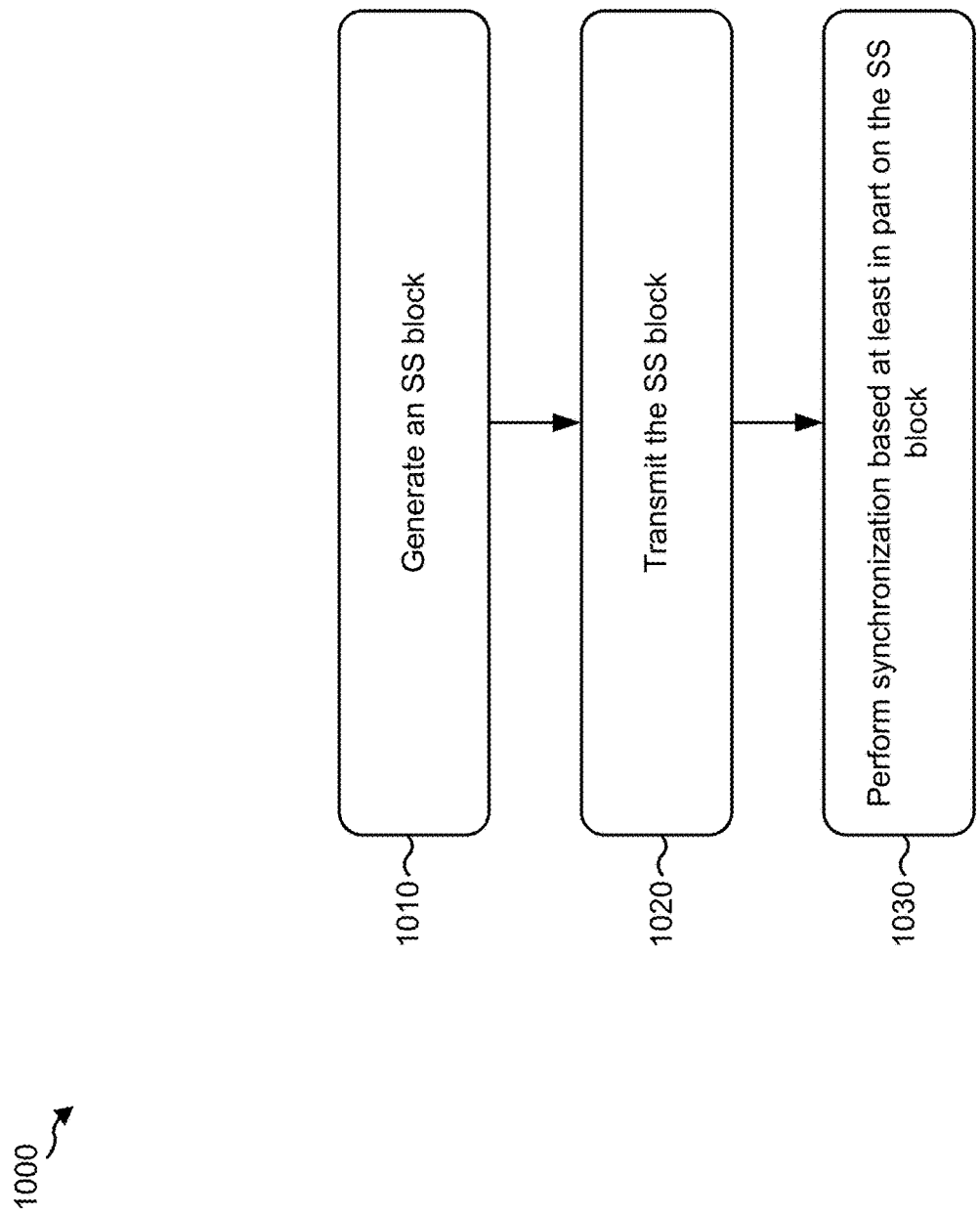
FIG. 10 is a flow chart of a method of wireless communication.

FIG. 10 is a flow chart of a method 1000 of wireless communication. The method may be performed by a base station (e.g., the BS 110 of FIG. 1, the BS 110 of FIGS. 5-8, the apparatus 1302/1302', and/or the like).

At 1010, the base station may generate an SS and/or broadcast channel block. For example, the base station may generate a PSS, an SSS, and/or one or more PBCHs. The PSS, SSS, and/or one or more PBCHs, when transmitted to an IoT UE in three or more consecutive slots, may be collectively termed a SS and/or broadcast channel block or a SS/PBCH block.

At 1020, the base station may transmit the SS and/or broadcast channel block. For example, the base station may transmit the SS and/or broadcast channel block. The base station may transmit the SS and/or broadcast channel block in at least three consecutive slots (e.g., three consecutive slots, four consecutive slots, etc.). In some aspects, the base station may determine at least one of a bandwidth or a subcarrier spacing of the SS and/or broadcast channel block based at least in part on a frequency band of the SS and/or broadcast channel block. In some aspects, the SS or broadcast channel is transmitted in a 5G band.

In some aspects, a minimum bandwidth of the IoT UE includes a single resource block in a 5G band. In some aspects, a minimum bandwidth of the IoT UE includes multiple resource blocks in a 5G band. In some aspects, the SS block is an Internet of Things (IoT) SS block, and the subcarrier spacing is different than a subcarrier spacing for a non-IoT SS block. In some aspects, the subcarrier spacing of the SS and/or broadcast channel block is different than a subcarrier spacing for a downlink shared channel in the frequency band.

In some aspects, a primary synchronization signal, a secondary synchronization signal, and a broadcast channel are each transmitted in a corresponding slot of the at least three consecutive slots. In some aspects, a first transmission of a broadcast channel and a retransmission of the broadcast channel are transmitted in the at least three consecutive slots.

In some aspects, a slot of the at least three consecutive slots includes fourteen symbols, and eleven symbols of the slot are used for the SS and/or broadcast channel block. In some aspects, a synchronization signal sequence associated with another radio access technology is used for a synchronization signal of the SS and/or broadcast channel block. In some aspects, a slot of the at least three consecutive slots includes fourteen symbols, and wherein ten symbols of the slot are used for the SS and/or broadcast channel block. In some aspects, a truncation of a synchronization signal sequence associated with another radio access technology is used for a synchronization signal of the SS and/or broadcast channel block.

In some aspects, eight symbols of a slot, of the at least three consecutive slots, are allocated to one of a synchronization signal or broadcast channel of the SS and/or broadcast channel block. In some aspects, the eight symbols do not overlap with a control symbol, a guard period symbol, or a data symbol of a data transmission associated with a different subcarrier spacing than the IoT UE. In some aspects, sixteen symbols of two consecutive slots, of the at least three consecutive slots, are allocated to one of a synchronization signal or broadcast channel of the SS and/or broadcast channel block. In some aspects, the sixteen symbols do not overlap with a control symbol, a guard period symbol, or a data symbol of a data transmission associated with a different subcarrier spacing than the IoT UE.

In some aspects, the SS and/or broadcast channel block is one of multiple SS and/or broadcast channel blocks, and each SS and/or broadcast channel block is associated with a different beam. In some aspects, the multiple SS and/or broadcast channel blocks are received within a time window, wherein a number of SS and/or broadcast channel blocks received within the time window is proportionate to the subcarrier spacing of the SS and/or broadcast channel block.

In some aspects, the three slots are consecutive slots. In some aspects, wherein the SS block is an Internet of Things (IoT) SS block, and the subcarrier spacing of the SS block is different than a subcarrier spacing for a non-IoT SS block. In some aspects, a first transmission of a broadcast channel and a retransmission of the broadcast channel are transmitted in the at least three consecutive slots. In some aspects, a slot of the at least three slots includes fourteen symbols, and wherein less than twelve symbols of the slot are used for the SS block. In some aspects, at least a portion of a synchronization signal sequence associated with a radio access technology different than one of the IoT UE is used for a synchronization signal of the SS block. In some aspects, a set of symbols of a slot, of the at least three slots, are allocated to one of a synchronization signal or broadcast channel of the SS block and wherein the set of symbols do not overlap with a control symbol, a guard period symbol, or a data symbol of a data transmission.

In some aspects, two consecutive slots, of the at least three slots, are allocated to one of the primary synchronization signal, the secondary synchronization signal, or the broadcast channel of the SS block, and wherein the primary synchronization signal, the secondary synchronization signal, or the broadcast channel does not overlap with a control symbol, a guard period symbol, or a data symbol of a data transmission for a non-IoT UE. In some aspects, the SS block is one of multiple SS blocks, and wherein each SS block is associated with a different beam. In some aspects, the multiple SS blocks are received within a time window, wherein a number of SS blocks received within the time window is proportionate to the subcarrier spacing of the SS block. In some aspects, a synchronization signal burst set periodicity of the IoT UE is shorter during a first mode than during a second mode. In some aspects, a synchronization signal burst set periodicity of the IoT UE is different than a synchronization signal burst set periodicity for a non-IoT UE.

At 1030, the base station may perform synchronization based at least in part on the SS and/or broadcast channel block. For example, the base station may perform an initial access or random access procedure with the IoT UE. Additionally, or alternatively, the base station may establish a connection with the IoT UE to provide access to a 5G network for the IoT UE.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
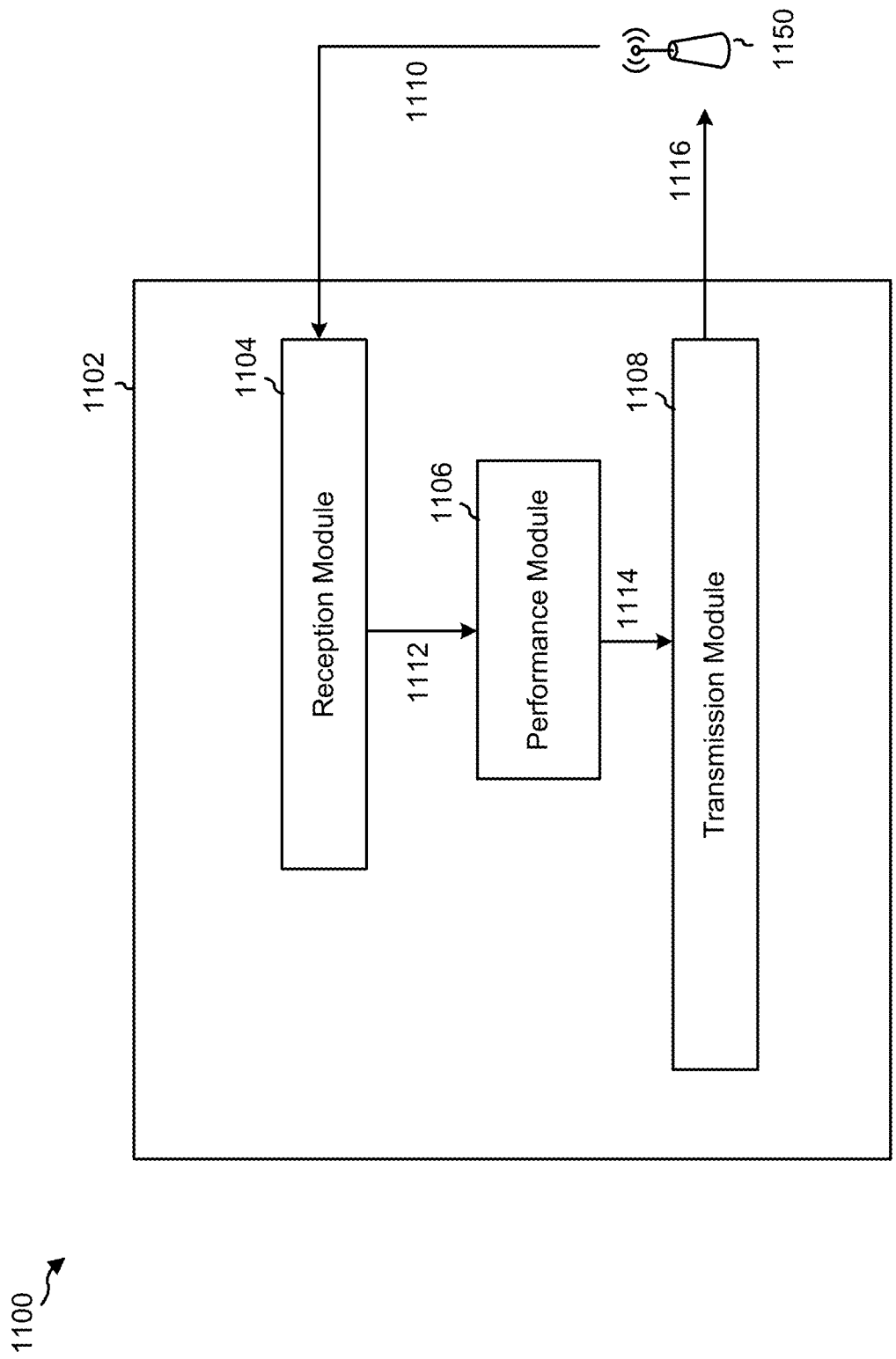
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a UE. In some aspects, the apparatus 1102 includes a reception module 1104, a performance module 1106, and/or a transmission module 1108.

The reception module 1104 may receive signals 1110 from a base station 1150 (e.g., the BS 110, a gNB, the apparatus 1302/1302', etc.). The signals 1110 may include a SS or broadcast signal block that includes at least three slots. In some aspects, reception module 1104 may receive a synchronization signal block, wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block. The reception module 1104 may provide the signals 1110 to the performance module 1106 as data 1112.

The performance module 1106 may perform synchronization with the base station 1150 based at least in part on the data 1112. In some aspects, the performance module 1106 may perform synchronization using the SS block (e.g., the SS block received as the signals 1110). For example, the performance module 1106 may determine cell timing, timing information, and/or the like. The performance module 1106 may provide data 1114 to the transmission module 1108 relating to the synchronization.

The transmission module 1108 may transmit signals 1116 to the base station 1150 based at least in part on the data 1114. The signals 1116 may include, for example, initial access or random access signals, and/or the like. Thus, the apparatus 1102 may synchronize with the base station 1150.

The apparatus may include additional modules that perform each of the blocks of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
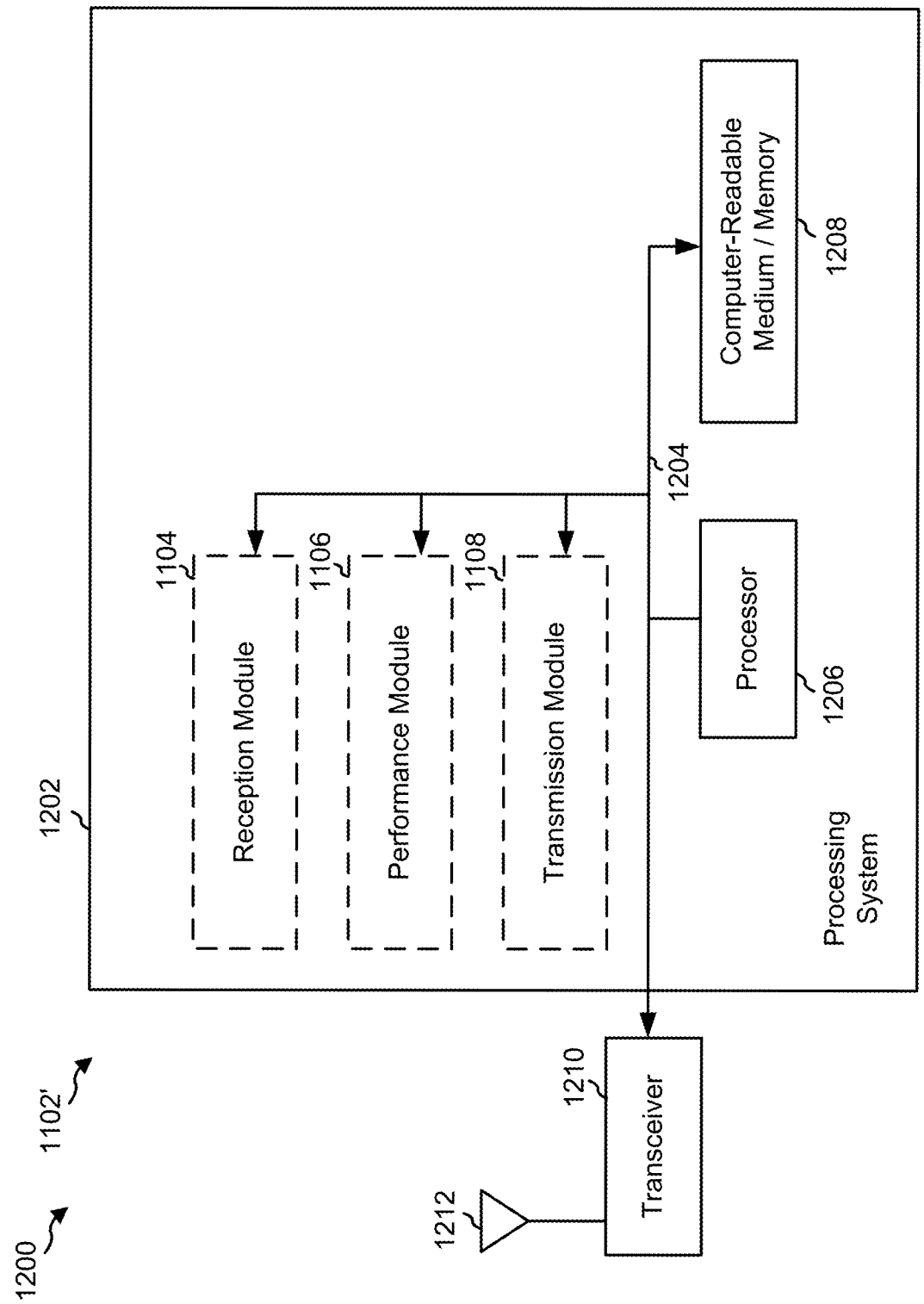
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, and 1108. The modules may be software modules running in the processor 1206, resident/stored in the computer-readable medium/memory 1208, one or more hardware modules coupled to the processor 1206, or some combination thereof. The processing system 1202 may be a component of the UE 120 and may include the memory 282 and/or at least one of the TX MIMO processor 266, the receive processor 258, and/or the controller/processor 280.

In some aspects, the apparatus 1102/1102' for wireless communication includes means for receiving a synchronization signal (SS) and/or broadcast channel block, wherein the SS and/or broadcast channel block includes at least three consecutive slots, and wherein at least one of a bandwidth or a subcarrier spacing of the SS and/or broadcast channel block is based at least in part on a frequency band of the SS and/or broadcast channel block; and means for performing synchronization using the SS and/or broadcast channel block. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 12 is provided as an example. Other examples are possible and may differ from what was described in connection with FIG. 12.

Figure 13:
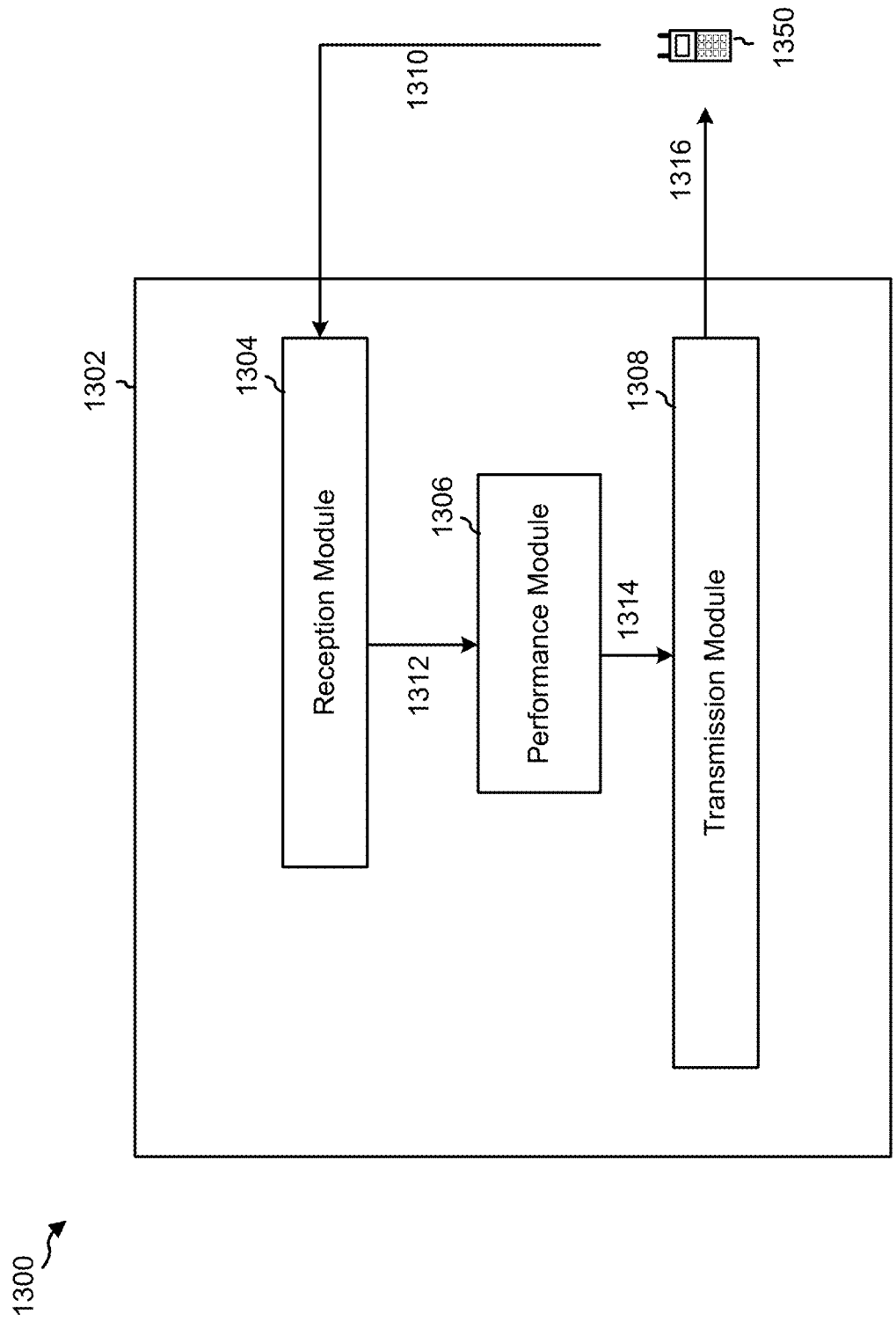
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a base station, such as a gNB. In some aspects, the apparatus 1302 includes a reception module 1304, a performance module 1306, and/or a transmission module 1308.

The reception module 1304 may receive signals 1310 from a UE 1350 (e.g., the UE 120, a 5G IoT UE, the apparatus 1102/1102', etc.). The signals 1310 may include, for example, random access information, initial access information, communication information, and/or the like. The reception module 1304 may provide the signals 1310 to the performance module 1306 as data 1312. The performance module 1306 may perform synchronization with the UE 1350 using an SS block. For example, the performance module 1306 may generate SS and/or broadcast channel blocks, may use initial access information to establish a connection with the UE 1350 and/or the like. The performance module 1306 may provide data 1314 to the transmission module 1308. The transmission module 1308 may transmit, as signals 1316, an SS and/or broadcast channel block (or multiple different SS and/or broadcast channel blocks) for the UE 1350 (or other 5G IoT UEs). In some aspects, the transmission module 1308 may transmit an SS block, wherein the SS block includes at least three slots, wherein a primary synchronization signal, a secondary synchronization signal, and a broadcast channel are each transmitted in a corresponding slot of the at least three slots, and wherein at least one of a bandwidth or a subcarrier spacing of the SS block is based at least in part on a frequency band of the SS block.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
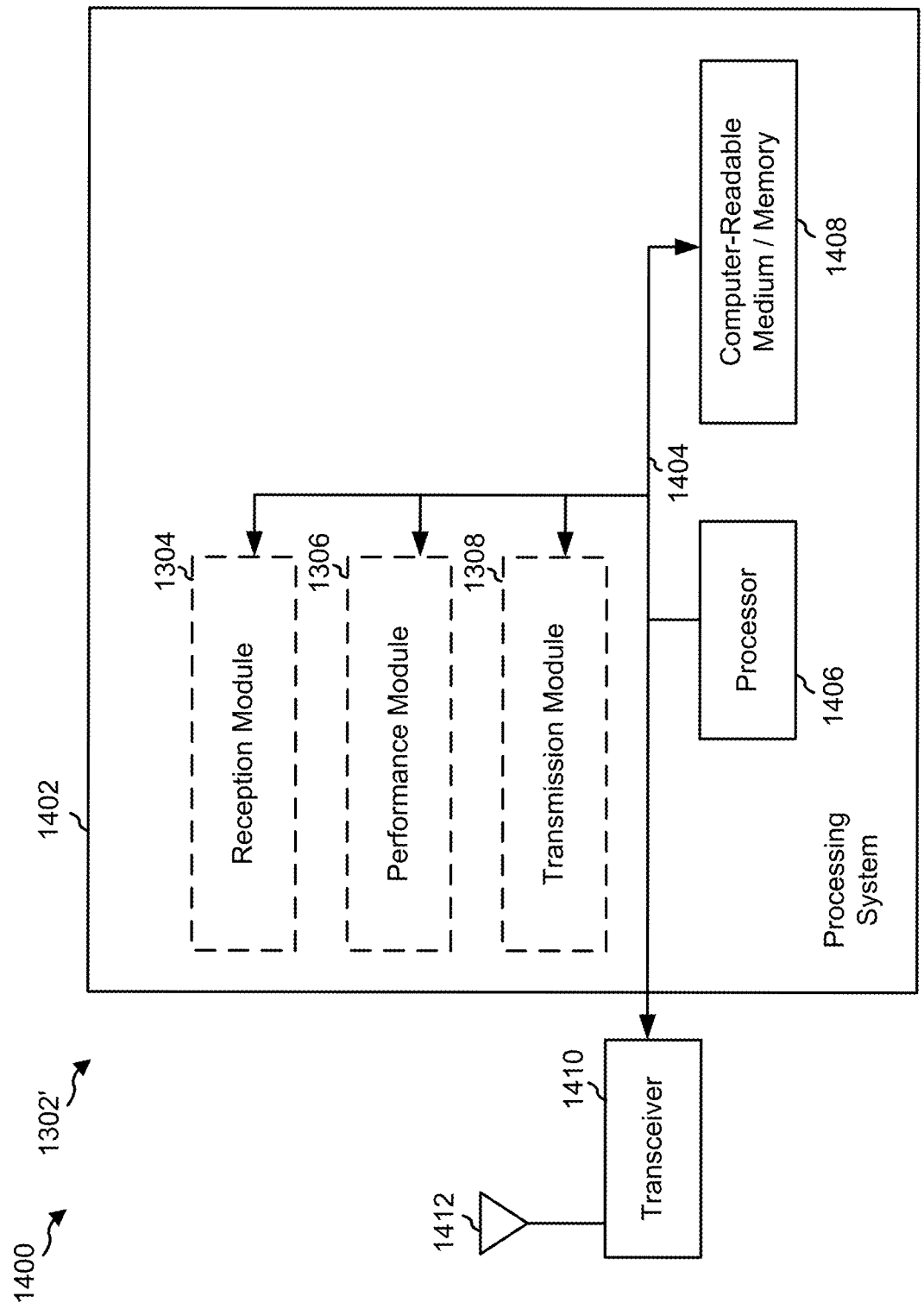
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a base station such as a gNB.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1308, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, and 1308. The modules may be software modules running in the processor 1406, resident/stored in the computer readable medium/memory 1408, one or more hardware modules coupled to the processor 1406, or some combination thereof. The processing system 1402 may be a component of the BS 110 and may include the memory 242 and/or at least one of the TX MIMO processor 230, the receive processor 238, and/or the controller/processor 240.

In some aspects, the apparatus 1302/1302' for wireless communication includes means for transmitting an SS and/or broadcast channel block for an IoT UE, wherein the SS and/or broadcast channel block includes at least three consecutive slots, and wherein at least one of a bandwidth or a subcarrier spacing of the SS and/or broadcast channel block is based at least in part on a frequency band of the SS and/or broadcast channel block; and means for performing synchronization with the IoT UE based at least in part on the SS and/or broadcast channel block. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 14 is provided as an example. Other examples are possible and may differ from what was described in connection with FIG. 14.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by an Internet of Things (IoT) user equipment (UE), comprising:
    receiving a synchronization signal (SS) block, wherein the SS block includes at least three slots, wherein a primary synchronization signal, a secondary synchronization signal, and a broadcast channel are each transmitted in a corresponding slot of the at least three slots, wherein at least one of a bandwidth or a subcarrier spacing of the SS block is based at least in part on a frequency band of the SS block, and wherein a number of SS blocks received within a time window corresponds to the subcarrier spacing of the SS block; and
    performing synchronization using the SS block.

2. The method of claim 1, wherein the at least three slots are consecutive slots.

3. The method of claim 1, wherein the subcarrier spacing of the SS block is different than a subcarrier spacing of a non-IoT SS block in the frequency band.

4. The method of claim 1, wherein a first transmission of a broadcast channel and a retransmission of the broadcast channel are transmitted in the at least three slots.

5. The method of claim 1, wherein a slot of the at least three slots includes fourteen symbols, and wherein less than twelve symbols of the slot are used for the SS block.

6. The method of claim 1, wherein at least a portion of a synchronization signal sequence associated with a radio access technology different than one used by the IoT UE is used for a synchronization signal of the SS block.

7. The method of claim 1, wherein a set of symbols of a slot, of the at least three slots, are allocated to one of a synchronization signal or broadcast channel of the SS block and wherein the set of symbols do not overlap with a control symbol, a guard period symbol, or a data symbol of a data transmission.

8. The method of claim 1, wherein two consecutive slots, of the at least three slots, are allocated to one of the primary synchronization signal, the secondary synchronization signal, or the broadcast channel of the SS block, and wherein the primary synchronization signal, the secondary synchronization signal, or the broadcast channel does not overlap with a control symbol, a guard period symbol, or a data symbol of a data transmission for a non-IoT UE.

9. The method of claim 1, wherein the SS block is one of multiple SS blocks, and wherein each SS block, of the multiple SS blocks, is associated with a different beam.

10. The method of claim 9, wherein the multiple SS blocks are received within flail the time window.

11. The method of claim 1, wherein a synchronization signal burst set periodicity of the IoT UE is shorter during a first mode than during a second mode.

12. The method of claim 1, wherein a synchronization signal burst set periodicity of the IoT UE is different than a synchronization signal burst set periodicity for a non-IoT UE.

13. A method of wireless communication performed by a base station, comprising:
    transmitting a synchronization signal (SS) block, wherein the SS block includes at least three slots, wherein a primary synchronization signal, a secondary synchronization signal, and a broadcast channel are each transmitted in a corresponding slot of the at least three slots, wherein at least one of a bandwidth or a subcarrier spacing of the SS block is based at least in part on a frequency band of the SS block, and wherein a number of SS blocks received within a time window corresponds to the subcarrier spacing of the SS block; and
    performing synchronization using the SS block.

14. The method of claim 13, wherein the at least three slots are consecutive slots.

15. The method of claim 13, wherein the SS block is an Internet of Things (IoT) SS block, and wherein the subcarrier spacing of the IoT SS block is different than a subcarrier spacing for a non-IoT SS block in the frequency band.

16. The method of claim 13, wherein a first transmission of a broadcast channel and a retransmission of the broadcast channel are transmitted in the at least three slots.

17. The method of claim 13, wherein a slot of the at least three slots includes fourteen symbols, and wherein less than twelve symbols of the slot are used for the SS block.

18. The method of claim 13, wherein at least a portion of a synchronization signal sequence associated with a radio access technology, different than a radio access technology of a user equipment associated with the SS block, is used for a synchronization signal of the SS block.

19. The method of claim 13, wherein a set of symbols of a slot, of the at least three slots, are allocated to one of a synchronization signal or broadcast channel of the SS block and wherein the set of symbols do not overlap with a control symbol, a guard period symbol, or a data symbol of a data transmission.

20. The method of claim 13, wherein the SS block is an Internet of Things (IoT) SS block, wherein two consecutive slots, of the at least three slots, are allocated to one of the primary synchronization signal, the secondary synchronization signal, or the broadcast channel of the SS block, and wherein the primary synchronization signal, the secondary synchronization signal, or the broadcast channel does not overlap with a control symbol, a guard period symbol, or a data symbol of a data transmission for a non-IoT user equipment.

21. The method of claim 13, wherein the SS block is one of multiple SS blocks, and wherein each SS block, of the multiple SS blocks, is associated with a different beam.

22. The method of claim 21, wherein the multiple SS blocks are received within flail the time window.

23. The method of claim 13, wherein a synchronization signal burst set periodicity of an Internet of Things (IoT) UE is shorter during a first mode than during a second mode.

24. The method of claim 13, wherein the SS block is an Internet of Things (IoT) SS block, and wherein a synchronization signal burst set periodicity of the SS block is different than a synchronization signal burst set periodicity of a non-IoT SS block.

25. An Internet of Things (IoT) user equipment (UE) for wireless communication, comprising:
 a memory; and
 at least one processor coupled to the memory, the memory and the at least one processor configured to:
  receive a synchronization signal (SS) block, wherein the SS block includes at least three slots, wherein a primary synchronization signal, a secondary synchronization signal, and a broadcast channel are each transmitted in a corresponding slot of the at least three slots, wherein at least one of a bandwidth or a subcarrier spacing of the SS block is based at least in part on a frequency band of the SS block, and wherein a number of SS blocks received within a time window corresponds to the subcarrier spacing of the SS block; and
  perform synchronization using the SS block.

26. The IoT UE of claim 25, wherein the at least three slots are consecutive slots.

27. The IoT UE of claim 25, wherein the SS block is one of multiple SS blocks, and wherein each SS block is associated with a different beam.

28. A base station for wireless communication, comprising:
 a memory; and
 one or more processors operatively coupled to the memory, the memory and the one or more processors configured to:
  transmit a synchronization signal (SS) block, wherein the SS block includes at least three slots, wherein a primary synchronization signal, a secondary synchronization signal, and a broadcast channel are each transmitted in a corresponding slot of the at least three slots, wherein at least one of a bandwidth or a subcarrier spacing of the SS block is based at least in part on a frequency band of the SS block, and wherein a number of SS blocks received within a time window corresponds to the subcarrier spacing of the SS block; and
  perform synchronization using the SS block.

29. The base station of claim 28, wherein the three slots are consecutive slots.

30. The base station of claim 28, wherein the SS block is one of multiple SS blocks, and wherein each SS block, of the multiple SS blocks, is associated with a different beam.

* * * * *